United States Patent [19]

Dilling

[11] Patent Number: 4,764,597
[45] Date of Patent: Aug. 16, 1988

[54] METHOD FOR METHYLOLATION OF LIGNIN MATERIALS

[75] Inventor: Peter Dilling, Isle of Palms, S.C.

[73] Assignee: Westvaco Corporation, New York, N.Y.

[21] Appl. No.: 61,460

[22] Filed: Jun. 15, 1987

[51] Int. Cl.$^4$ .................................................. C07G 1/00
[52] U.S. Cl. ..................................... 530/501; 530/500
[58] Field of Search ................................ 530/501, 500

[56] References Cited

U.S. PATENT DOCUMENTS

| | | | |
|---|---|---|---|
| 2,680,113 | 6/1954 | Adler et al. | 260/124 |
| 2,976,273 | 3/1961 | Ball | 530/501 X |
| 4,221,708 | 9/1980 | Lin | 530/501 |
| 4,521,336 | 6/1985 | Dilling | 530/501 |
| 4,590,262 | 5/1986 | Dilling | 530/500 |
| 4,629,469 | 12/1986 | Dilling | 530/501 X |
| 4,642,336 | 2/1987 | Dilling | 530/501 X |

*Primary Examiner*—Earl Nielsen
*Attorney, Agent, or Firm*—Terry B. McDaniel; Richard L. Schmalz

[57] ABSTRACT

An improved method of producing methylolated lignins from the black liquor residue of a kraft wood-pulping process, which methylolated lignins may be further employed in other chemical reactions, such as in the production of sulfomethylated lignin salts suited for use as dyestuff dispersants, comprising the steps of oxidizing the black liquor residue of a kraft wood-pulping process containing lignin, organic, and inorganic salts, treating the black liquor residue with an aldehyde to methylolate the lignin therein, lowering the pH of the black liquor residue to precipitate the lignin therefrom, and isolating and recovering the methylolated lignin for subsequent chemical reactions. The black liquor residue of the kraft pulping process is oxidized, before methylolation of the lignin therein, to reduce the presence of sodium sufide in the black liquor residue to about 1 percent or less.

6 Claims, No Drawings

METHOD FOR METHYLOLATION OF LIGNIN MATERIALS

The present invention relates to an improved method for methylolation of lignin materials, and, more particularly, to a method of in situ methylolation of the lignin components of the black liquor of a kraft paper-making process.

BACKGROUND OF THE INVENTION

As is well known, lignin is a complex, high-molecular weight polymer occurring naturally in close association with cellulose in plants and trees. Lignin constitutes, on a dry weight basis, approximately 27% to 33% of the tree in softwoods and approximately 20% to 24% in hardwoods. In the paper-making industry, lignin is recovered as a by-product of the cellulose product by two principal pulping processes known as the sulfite process and the kraft process. In the sulfite pulping process, lignin is solubilized from the cellulosic portion of the wood pulp by direct sulfonation, while the kraft process is based on an alkaline degradation mechanism causing cleavage of $\beta$-aryl ether linkages in the polymeric lignin which subsequently results in chemical functions of the phenolic and carboxylic type. Kraft lignin is isolated by acid precipitation from the black liquor of a kraft pulping process at a pH below the pKa of the phenolic groups.

The high degree of chemical activity which is characteristic of lignin salts permits the preparation of many novel and economical organic derivatives. Typical reactions which lignins can undergo are hydrogenation, halogenation, nitration, sulfonation, oxygenation, salt formation, etherification, and esterification. Lignin by-products variously have been employed in various chemical compositions as a surfactant, extender, dispersant, reinforcement, absorbent, binder, sequestering agent, emulsifier and emulsion stabilizer, and as a stabilizing and protective colloid. Lignosulfonate compounds, particularly sodium salts of lignosulfonates, have been employed as additives and dispersants in textile dyestuffs and printing pigments. Sodium salt sulfonated lignin by-products have been sold for many years under the trademark Indulin ® by Westvaco Corporation of North Charleston, S.C.

Reduction in the pH of black liquor containing soluble lignin salts generally has been accomplished by introduction of carbon dioxide which converts the phenolic hydroxyl groups on the lignin molecule, which are in ionized form, into their free phenolic or acidic form. This conversion renders the lignin insoluble in the black liquor, and, as a result, it precipitates out. To precipitate the alkali lignin from the black liquor, the pH of the black liquor, initially around 13, is lowered to a pH of about 10.5 at which point lignin precipitation begins. Lignin obtained from the kraft process is not recovered as a sulfonated by-product, but is sulfonated, if desired, by reacting the material with a sulfur and oxygen-containing compound. Sulfonated lignins are understood to be those containing at least an effective amount of sulfonate groups to give water solubility in moderately acid and higher pH solutions.

One conventional process for sulfonating kraft lignins involves sulfomethylation of the alkali lignin by reacting the lignin with sodium sulfite and formaldehyde. Such a process is described in Adler, et al. U.S. Pat. No. 2,680,113. Recently, it has been proposed to sulfomethylate kraft process lignins to produce a low electrolyte-containing product in a two-step lignin isolation where the ionized phenol component of the lignin is methylolated after precipitation isolation from the black liquor, in alkaline solution by the addition of an aldehyde, the pH is then lowered to acid to precipitate the methylolated lignin and wash the precipitate to remove undesired inorganic salts and electrolytes therefrom, and the lignin thereafter sulfonated by addition of a salt, typically sodium, and also ammonium, of a sulfur and oxygen-containing compound. Such processes are described in commonly assigned U.S. Pat. No. 4,590,262 which issued May 20, 1986, and U.S. Pat. No. 4,642,336 which issued Feb. 10, 1987.

More recently, it has been proposed to produce sulfomethylated lignin amine salts of the lignin by-products of the black liquor residue of a kraft wood-pulping process. Such amine salts of lignosulfonates are particularly suited for use as additives in dyestuffs, pesticides, and other chemical compounds, and their production is disclosed in co-pending commonly assigned U.S. patent application Ser. No. 06/783,781 filed Oct. 3, 1985. It has been found that sulfonated lignin salts containing a cation having a relatively low disassociation constant and pKa, such as the amine salts, have less tendency when used as a dispersant to cause azo dyestuff reduction and less color loss than is the case in the use of the higher pKa lignin salts, such as sodium or ammonium. Such products are also formed by a two-step lignin isolation/filtration process whereby undesired inorganic salts and electrolytes are removed by water wash of the methylolated lignin before sulfonation to produce low electrolyte-containing sulfomethylated lignin salts causing less azo dye reduction and color loss when used as dispersants in azo dye systems.

Generally, in preparation of methylolated lignins from the black liquor of a kraft pulping processes as described above, it has been the practice to isolate the lignin recovered from the black liquor by an acid precipitation and filtration step, and to thereafter react the filtered recovered lignin by-product in alkaline solutin at a pH level of about 9 to 11 with an aldehyde compound to carry out methylolation.

More recently, as set forth in co-pending commonly assigned U.S. patent application Ser. No. 819,600 filed Jan. 17, 1986, an improved method for preparing low electrolyte sodium lignosulfonates has been proposed wherein the isolated lignin material precipitated from the black liquor of a kraft pulping process is methylolated in alkaline liquid medium, and the pH of the liquid medium lowered to the acid range by addition of sulfur dioxide to precipitate the same, and thereafter the precipitated methylolated lignin is heated to sulfonate the same. Such improved method of producing low electrolyte-containing sulfomethylated lignin products involves only one lignin isolation step in its recovery and processing from the black liquor, instead of two, as had been practiced heretofore.

Commonly assigned U.S. Pat. No. 4,629,469 discloses a method of producing a product of the black liquor residue of kraft pulping process which may be used in conjunction with lignosulfonate salt dispersants to provide humectant properties to dyestuff compositions. The process described in the patent involves the steps of oxidizing the black liquor residue of a kraft pulping process, methylolating the lignin component of the oxidized liquor residue, adding sulfur dioxide to the methylolated lignin-containing oxidized residue to adjust the pH to the range of between about 2 to 10, adding equal molar quantities of formaldehyde to the amount of any residual sodium sulfite in the residue, heating the resultant residue under sufficient conditions to sulfomethylate the lignin components of the residue, and concentrating the residue to a solids content of between about 50% to 70% with adjustment of the pH to about 7.5. The black liquor residue product may then be effectively used as a humectant additive, along with a dispersant, such as a sulfomethylated lignin salt produced by the lignin isolation methods described above, in dyestuff compositions.

It can be appreciated that in production of methylolated lignins and sulfomethylated lignins for use as primary dispersants in dyestuff compositions, it is most desirable to minimize the number of lignin isolation steps involved in the recovery and manufacturing process. In the processes hereinabove described for producing sulfomethylated lignin salts as dyestuff dispersants, it has been the practice to first isolate the lignin material from the black liquor of a kraft pulping process before its methylolation, necessitating the use of pH-lowering chemicals to reduce the pH of the black liquor to the lignin precipitation point for recovery of the same, followed by the addition of pH-raising chemicals for carrying out the methylotion step. Such reduction of the acidity of the black liquor before methylolation obviously involves an added cost in the recovery and preparation of the lignin by-product suitable for use as chemical additives in other chemical processing operations, such as dispersants and additives in dyestuffs and pigments. If methylolated lignins recovered from kraft black liquor are to be used as intermediates in other chemical manufacturing processes, it is likewise desirable that the recovery process steps of lignin isolation be minimized for economics of manufacture.

BRIEF OBJECTS OF THE PRESENT INVENTION

It is therefore an object of the present invention to provide an improved method of producing methylolated lignins from the black liquor of a kraft pulping process wherein the lignin components may be methylolated in situ in the black liquor before their isolation for subsequent processing or use as a chemical additive in other chemical applications.

It is a more specific object to provide an improved method of producing a low electrolyte sulfomethylated lignin salt from the black liquor of a kraft pulping process which is suitable for use as a chemical additive in other applications such as dyestuff dispersants, wherein the lignin material need not be isolated from the black liquor of the pulping process before its methylolation.

SUMMARY OF THE INVENTION

The present invention is directed to an improved method of producing methylolated lignins from the black liquor of a kraft pulping process by methylolating the lignin in situ in the black liquor followed by its isolation and recovery therefrom. The method comprises the steps of oxidizing the alkaline pH black liquor composition containing the dissolved lignin components therein followed by methylolation of the lignin by the addition of an aldehyde directly to the black liquor composition before isolation and recovery of the lignin component by lowering of the pH of the black liquor. The resultant isolated methylolated lignin can then be subsequently employed as an intermediate in other chemical reactions, such as in the production of amine lignins useful as asphalt emulsifiers, cross-linked with phenolic resins, reacted with hexamethylene tetramine to produce hexalignin, or reacted on the acid side using heretofore known low electrolyte sulfonation reaction principles to produce sulfomethylated lignin salt derivatives, e.g., sodium, amine, and ammonium salts, suitable for use as dispersants in dyestuff compositions.

More specifically, the black liquor residue is oxidized until the sodium sulfide content of the liquor is reduced to about 1 percent, or less, at which point the lignin components therein may be effectively methylolated and thereafter isolated from the liquor by acidification to lower the liquor pH and cause precipitation of the methylolated lignin product. By eliminating the need of a lignin isolation step in its recovery from the black liquor of a kraft pulping process before its methylolation, the present improved method not only is more economical because of the savings in use of additional chemicals to raise and lower the pH of the lignin composition for methylolation and subsequent sulfonation, but reduces the amount of undesirable hydrogen sulfide gas by-products produced by the aforementioned two-step lignin isolation processes.

DETAILED DESCRIPTION OF PREFERRED EMBODIMENTS

As heretofore defined, the present invention is directed to an improved method for producing methylolated lignin products from the lignin by-products of a kraft wood-pulping process wherein in the lignin may be effectively methylolated in situ in the black liquor of the kraft pulping process, and thereafter isolated and recovered, without the need for recovery and isolation of the lignin material from the black liquor before methylolation, as has been a practice in the past. The methylolated lignin may then be subsequently variously treated, as by sulfonation or other chemical reactions, for use as chemical additives in other chemical compositions and processes.

Basically, the steps of the present method comprise (1) oxidizing the alkaline pH black liquor of a kraft pulping process containing lignin material dissolved therein, (2) treating the oxidized black liquor by reaction with an aldehyde to methylolate the lignin material contained therein, and (3) subsequently lowering the pH of the black liquor to precipitate, isolate, and remove the methylolated lignin material therefrom.

Specifically, it has been found that the lignin material dissolved in the black liquor may be effectively methylolated in situ and thereafter recovered for subsequent processing, e.g., sulfonation, by first oxidizing the black liquor to reduce the sodium sulfide content thereof to one percent or less. Economically, oxidation may be carried out by bubbling air through the black liquor prior to methylolation. The dissolved lignin material of the black liquor may then be methylolated effectively by the addition of an aldehyde compound, such as formaldehyde, and reacted in the black liquor under conditions to carry out the methylolation step. Thereafter, the pH of the black liquor is reduced to precipitate and isolate the methylolated lignin product, after which it may be water-wash purified of inorganic salts and subsequently used in other chemical reactions.

Typically, the black liquor residue of a kraft wood-pulping process contains approximately 33% lignin, 33% inorganic salts, and 33% saccarinic and other organic acids. Sodium sulfide ($Na_2S$) is one of the inorganic salts present in the black liquor residue, and its presence therein can be conveniently monitored as a guide in determining the degree of oxidation necessary of the black liquor residue before methylolation of the lignin. Generally, sodium sulfide is present at an initial level in the black liquor residue of about 6% to 8%. It has been found that when its presence is reduced to 1% or less through oxidation, the lignin can then be effectively methylolated and subsequently isolated for recovery in relatively pure form suitable for use as an intermediate in other chemical processing operations.

The monitoring of the sodium sulfide present in the black liquor residue during oxidation may be accomplished, as follows:

Five grams sodium bisulfite, 40 ml of 4 normal sodium hydroxide, and 60 ml of deionized water are combined and dissolved completely in a 500 ml beaker, and approximately 10 grams of black liquor to be tested are added to this solution. Sulfide sensitive electrodes of the type manufactured by Fisher Scientific are immersed in the liquid sample and the sample allowed to stabilize. The stabilized solution is titrated with 0.1 normal mercuric chloride. At an approximate millivolt reading of 700, the titrant is added in 1 ml increments. When the millivolt reading of the solution starts to drop rapidly, a break point is achieved and the milliliters of titrant required is recorded. In recording, the higher the millivolt reading, the more $Na_2S$ is present in the sample. The amount of sodium sulfide is calculated, as follows:

$$\frac{\text{ml. of Titrant} \times \text{Normality of Titrant} \times \text{Equiv. Wt. of Titrant}}{\text{Sample Weight} \times \text{\% Solids}} \times 100 = \text{\% } Na_2S \text{ in oxidized black liquor based on solids}$$

The following examples are presented to illustrate the in situ methylolation method of the present invention and to show favorable comparison of the same with the two-step lignin isolation method in producing low electrolyte-containing lignins for use as dyestuff dispersants.

EXAMPLE I

A first sample of the black liquor residue of a kraft wood-pulping process having a pH of about 13 and containing lignin, inorganic salts, and saccarinic and other organic acids is oxidized by bubbling air therethrough while monitoring the presence of sodium sulfide therein by the procedure set forth above. The oxidation reaction is carried out until the sodium sulfide content is slightly less than 1.0%.

The oxidized black liquor residue is then heated to 70° C. with adequate stirring and three pound moles of formaldehyde per 1,000 pounds of lignin (1 mole) present in the black liquor is added thereto. The temperature of the black liquor residue is maintained at 70° C. for 2 hours to methylolate the lignin therein.

The black liquor containing methylolated lignin is acidified with dilute sulfuric acid to a pH of four and the lignin heat-coagulated at 85° C., filtered, and water-washed to remove inorganic salts and other impurities therefrom.

The methylolated lignin product in 25% solids aqueous slurry is adjusted to a pH of 7 with triethanolamine. Two pound moles of triethanolamine per 1,000 pounds of lignin (1 mole) is then added to the slurry and $SO_2$ gas applied thereto to readjust the pH of the slurry to 7.0–7.3. The slurry then is reacted at 205° F. for 12 hours to sulfonate the methylolated lignin and produce a sulfomethylated lignin amine salt suitable for use as a dyestuff dispersant.

EXAMPLE II

To compare the method of the present invention as described in Example I with the two-step lignin isolation methods, a second sample of the black liquor residue was treated with carbon dioxide to lower the pH of the liquor to approximately 9.5 to precipitate the lignin which was then filter-isolated from the black liquor. The lignin was thereafter acidified to a pH of 2.5 with dilute $H_2SO_4$, heat-coagulated at 85° C., and filtered with water to wash and remove inorganic salts and other impurities therefrom.

An aqueous 25% solids slurry of the recovered lignin is adjusted to a pH of 11 with sodium hydroxide, heated to 70° C. with adequate stirring, and 3.0 pound moles formaldehyde per 1,000 pounds of lignin (1 mole) is added thereto. The temperature is maintained at 70° C. for 2 hours to methylolate the lignin. The methylolated lignin slurry is acidified to a pH of 2.5 with dilute sulfuric acid to precipitate the lignin which is heat-coagulated at 85° C., filtered, and water-washed.

The methylolated lignin in 25% solids aqueous slurry is adjusted to a pH of 7 with triethanolamine, and 2 pound moles of triethanolamine per 1,000 pounds of lignin is added thereto. Sulfur dioxide is added to the slurry to readjust the pH to 7.0–7.3 and the slurry reacted by heat at 205° F. for 12 hours to produce a sulfomethylated lignin amine salt suitable for use as a dyestuff dispersant.

The lignin amine salts produced by the methylolation methods described in Examples I and II are tested for heat stability, fiber staining, and azo dye reduction tendencies by the following procedures.

To obtain heat stability measurements, dye/lignin compositions are prepared from each of the products of Examples I and II above. The compositions consist of 50 grams of C. I. Azo Blue 118 or Red I dyestuff, 35 grams of the particular sulfomethylated lignin salt, and 125 ml of water, and the pH of each composition is adjusted to 7, if necessary, with acetic acid. Each dye composition containing a lignin additive is ground in a ball mill to the point where the filter test for dispersed dye is passed. To one gram of each solid dye composition is added 250 ml of water. The pH is adjusted to 5 (acetic acid) after which the solution is boiled for 15 minutes, and then filtered through a tared Watman filter paper No. 2 above a No. 4 paper (with vacuum). The time for the filtration is recorded, the filter paper dried, and the residual dye material remaining on the filter is calculated by weight and individually observed.

Fiber staining tests utilizing the products of Examples I and II are carried out by measuring light reflectance of wool and nylon 5 gram skeins to which 5 grams of the lignin salts are added in 200 ml of water, boiled for 15 minutes at a pH of 4, and the results recorded, in percent light reflectance, as measured on a Photovolt Reflection Meter Model No. 610 by Photovolt Corporation.

Azo dye reduction of the sulfonated lignin amine salts of Examples I and II above are measured by light reflectance comparing their color loss, in percent, with a control dyed polyester fiber skein. Five gram polyester fiber skeins are dyed with the products of Examples I and II at pH 5 utilizing 1 gram lignin to 0.1 gram CI Blue 79 dyestuff in 200 ml of water at 130° C. for 30 minutes. The control dyed fiber skein is dyed with the C. I. Blue dyestuff, but utilizing a non-reducing Tamol ® naphthalene sulfonate dispersant in place of the amine lignin salt products of Examples I and II. The color loss of the dyed skeins of the lignin amine salts of Examples I and II are compared to the control color sample and the results recorded.

The results of heat stability, fiber staining, and azo dye reduction tendency tests utilizing the lignin dispersant products of Examples I and II are presented in the following table:

TABLE I

| Dispersant Product | Heat Stability, Filter Residue, in mgs. | Fiber Staining, % Reflectance | | Azo Dye Reduction Color Loss; % (0.1 gm CI Blue 79/ 1 gm lignin in 200 ml/H$_2$O) |
|---|---|---|---|---|
| | | pH 4 | pH 7 | |
| Lignin amine salt of Example I | (CI Blue 118) 9.8 (CI Red I) 9.5 | (Wool) 56 (Nylon) 66 | 76 80 | 1.0 |
| Lignin amine salt of Example II | (CI Blue 118) 10.6 (CI Red I) 6.2 | (Wool) 58 (Nylon) 67 | 74 78 | 1.3 |
| Control dye composition containing naphthalene sulfonate | — | — | — | 0 |

From the foregoing results presented in Table I, it can be seen that the one-step in situ methylolation method of producing a methylolated lignin (Example I), as compared to the prior art two-step lignin isolation of Example II, produces comparable results in heat stability, fiber staining, and azo dye reduction, indicating the utility and suitability of the one-step in situ methylolation method for producing sulfomethylated lignin salts suitable for use as dispersants in dyestuff compositions.

As heretofore indicated, it is contemplated that the one-step in situ methylolation method of producing methylolated lignins from the black liquor of a kraft pulping process provides intermediate chemical products which may be employed in various other chemical reactions, such as the production of sulfomethylated lignin salts for use as dye dispersants, lignin amine salts useful as asphalt emulsifiers, methylolated lignins which may be cross-linked with phenolic resins, or methylolated lignin which may be reacted with hexamethylenetetramine to produce hexalignin.

That which is claimed, is:

1. An improved method of producing methylolated lignins from the black liquor residue of a kraft woodpulping process comprising the steps of:
    (a) oxidizing the black liquor residue of a kraft woodpulping process containing lignin, inorganic salts, and organic salts therein;
    (b) methylolating the lignin present in the black liquor residue;
    (c) lowering the pH of the black liquor residue to precipitate the methylolated lignin therefrom; and
    (d) isolating and recovering the precipitated methylolated lignin from the black liquor residue.

2. A method as defined in claim 1 wherein the black liquor residue contains sodium sulfide as a component therein, and wherein the black liquor residue is oxidized sufficiently to reduce the presence of sodium sulfide in the black liquor residue to about 1 percent or less.

3. A method as defined in claim 2 wherein the black liquor residue is oxidized by bubbling air or oxygen therethrough.

4. A method as defined in claim 2 wherein the lignin in the black liquor residue is methylolated by the addition of an aldehyde compound to the black liquor residue and the residue heated to methylolate the lignin therein.

5. A method as defined in claim 2 wherein the pH of the black liquor residue is lowered by the addition of sulfuric acid thereto to precipitate the lignin from the black liquor residue.

6. A method as defined in claim 2 wherein the isolated methylolated lignin, after recovery from the black liquor residue, is subsequently treated with a sulfur-oxygen-containing compound in the presence of a salt selected from the group consisting of sodium, ammonium, and amines to produce a sulfomethylated lignin salt suited for use as a dyestuff dispersant.

* * * * *